United States Patent [19]

Marenchin

[11] 3,949,459

[45] Apr. 13, 1976

[54] TRANSMISSION TOOLS

[76] Inventor: John A. Marenchin, 2639 Longview Road, Sharon, Pa. 16146

[22] Filed: July 22, 1974

[21] Appl. No.: 490,488

[52] U.S. Cl........... 29/427; 29/226; 29/235; 29/239; 29/256

[51] Int. Cl.$^2$ .......................................... B23P 19/02

[58] Field of Search ............. 29/256, 257, 270, 225, 29/226, 229, 235, 239, 242, 426, 427, 200 H, 200 R

[56] References Cited

UNITED STATES PATENTS

| | | | |
|---|---|---|---|
| 1,499,082 | 6/1924 | Stadler | 29/256 |
| 2,229,256 | 1/1941 | Pfauser et al. | 29/239 |
| 2,408,450 | 10/1946 | Schrader | 29/427 |
| 3,115,699 | 12/1963 | Nakahira | 29/226 |
| 3,344,500 | 10/1967 | Wilson | 29/235 |
| 3,593,982 | 7/1971 | Price | 29/256 |

*Primary Examiner*—C. W. Lanham
*Assistant Examiner*—James R. Duzan
*Attorney, Agent, or Firm*—Michael Williams

[57] ABSTRACT

The improved transmission tools are adapted to compress springs forming parts of the front and rear servo assemblies of an automatic transmission, so that snap spring locks may be removed to permit removal of the assemblies from the transmission housing. The tools make use of holes which are already part of the transmission housing, and include parts which are freely inserted in such holes, but which bind in the holes when the tool is canted slightly so as to permit force to be applied to the respective spring to compress it and therefore permit removal of the respective snap ring lock.

6 Claims, 6 Drawing Figures

FIG. 1.
PRIOR ART
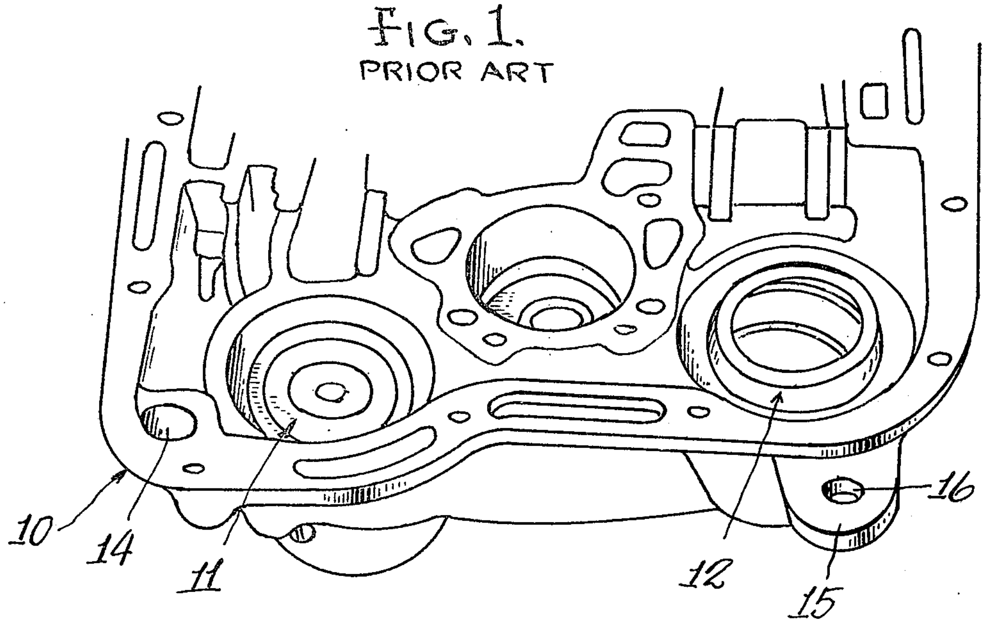
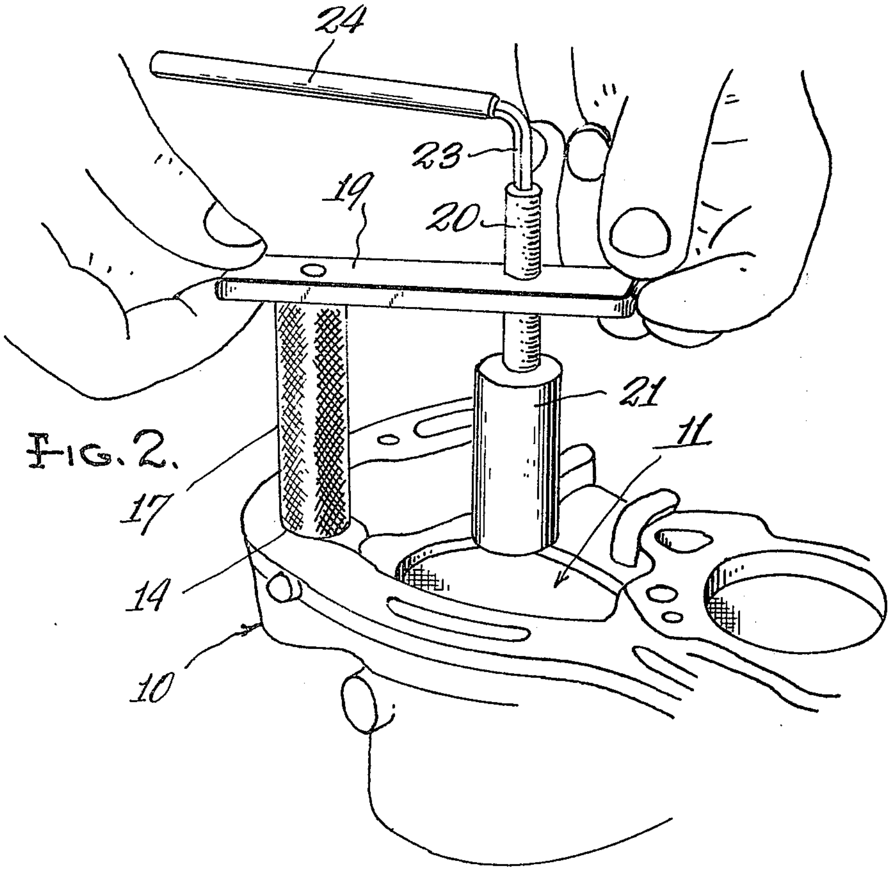
FIG. 2.

TRANSMISSION TOOLS

BACKGROUND AND SUMMARY

The prior art includes tools for compressing springs to permit removal of snap ring locks, but the tools of which I am aware are complicated in structure and therefore costly to manufacture.

My improved tools are particularly adapted for use in removing the front and rear servos of a Torqueflite transmission although it will be understood that they may be used with other transmissions which have similar housing structure. The current Torqueflite transmission manual, at page 21–94, suggests the use of an engine valve spring compressor tool to compress the kickdown servo spring, and this tool requires that it be clamped to the transmission housing before it may be operated.

My improved tool eliminates the clamping action by utilizing the oil filler hole of the transmission for removal of the front servo, and a manufacturing lug on the transmission for removal of the rear servo. The tool includes a stem, preferably with a roughened peripheral surface, which may be freely inserted in the filler hole or the hole in the manufacturing lug, but which will bind in such holes when the tool is slightly canted. This locks the tool in place so that the spring may be compressed and the snap ring lock removed.

DESCRIPTION OF THE DRAWINGS

In the drawings accompanying this specification and forming a part of this application, there are shown, for purpose of illustration, two embodiments which my invention may assume, and in these drawings:

FIG. 1 is a fragmentary, perspective view of a Torqueflite transmission, to show parts thereof which are used to accommodate my improved tools, FIG. 2 is a fragmentary, perspective view showing an initial step in assembling a tool for removal of the front servo of the transmission.

DESCRIPTION OF THE FIRST EMBODIMENT

Figure 3:
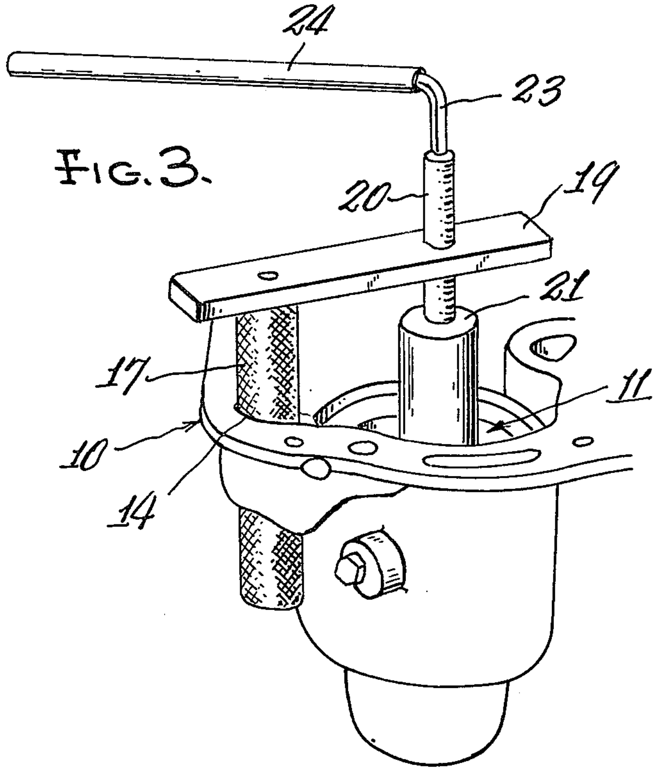
FIG. 3 is a view similar to FIG. 2, but showing the tool in position to compress the kickdown spring of the front servo.

FIG. 1 shows the pertinent parts of a Torqueflite transmission with the cover (not shown) removed. The transmission includes a housing 10 having a front servo 11 and a rear servo 12. With the cover removed, the oil filler hole 14 is exposed. The housing also has a lug 15 which is provided for use during manufacture of the housing, and this lug has an opening 16.

Figure 4:
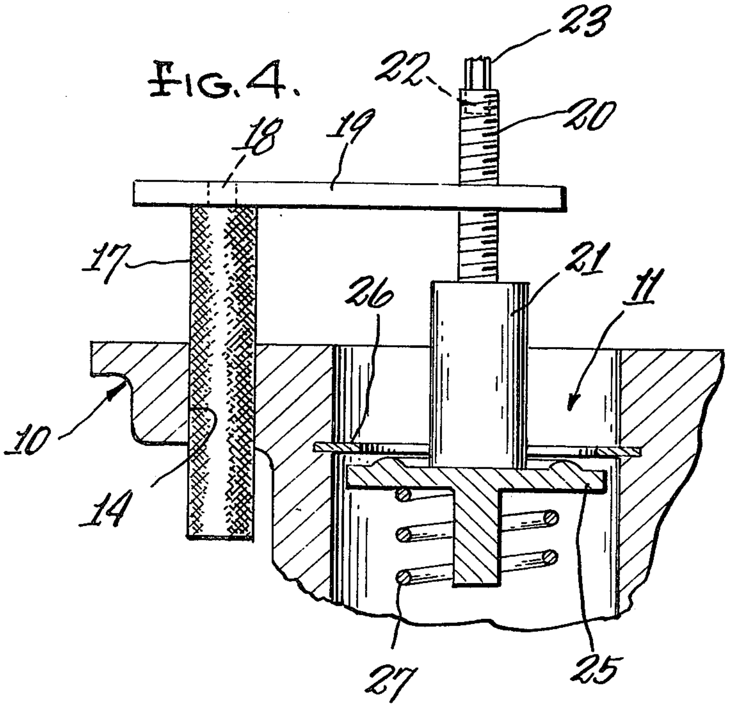
FIG. 4 is a fragmentary, sectional view generally showing the action of the tool.

The tool for compressing the kickdown spring of the front servo comprises a stem 17, such as a steel rod, which is of a diameter slightly less than the diameter of the oil filler hole 14, so that it may be freely inserted into the hole. Preferably, the stem has a roughened peripheral surface, such as the knurled surface shown. As seen in FIG. 4, the upper end of the stem 17 is reduced at 18 to fit within a hole in a steel plate 19, and assembly of these parts may be effected by a screw thread connection, or the extremity of the reduced portion may be peened over the plate.

The metal rod 20 is threaded through the plate and at its lower end is connected to a metal plug 21, which may be cylindrical as shown. The upper end of the screw rod 20 is formed with a hexagonal hole 22 to removably receive the end of an Allen wrench 23.

The tool is simply assembled with the transmission housing 10 in the manner shown in FIG. 2. The plate 19 may be held at its opposite ends by the fingers of a mechanic and the stem 17 inserted into the oil filler hole 14. When the stem reaches the position shown in FIG. 3, the tool is canted slightly so that the stem will bind in the oil filler hole. The Allen wrench 23 may then be rotated and an extension tube 24 may be used to increase the turning torque. The threaded rod 20 is turned to lower the plug 21 into forcible engagement with the upper surface of a seal ring or spring retainer 25 of the front servo and turning of the rod is continued to unseat the seal ring from the snap ring lock 26 and compress the kickdown spring 27. The snap ring lock may now be removed through use of any suitable tool, such as a screw driver or pliers, whereupon the entire servo mechanism may be removed from the transmission housing.

DESCRIPTION OF SECOND EMBODIMENT

Figure 6:
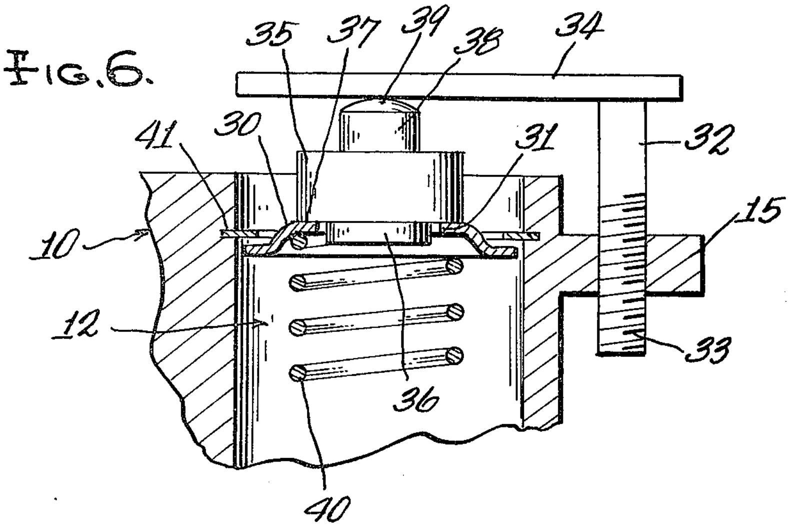
FIG. 6 is a fragmentary, sectional view generally showing the action of the tool.

The tool for removing the rear servo mechanism from the transmission housing is somewhat similar to that described, but is altered because the spring retainer 30 (see FIG. 6) has a central opening 31 therein.

The tool, as before, comprises a stem 32 which has a roughened peripheral surface. The stem surface may be knurled, as before, or may be formed with screw threads 33, as shown. The stem 32 is rigidly connected to one end of a plate 34 and the opposite end of the latter is adapted to bear against the upper end of a plug 35 which may otherwise be made as a separate part. The plug 35 has a lower pilot portion 36 to fit within the opening 31 of the spring retainer 30. The central portion of the plug is enlarged, to form a shoulder 37 adapted to press against the spring retainer, and the upper portion 38 of the plug may be of reduced diameter and formed with a rounded upper end 39 adapted to have rocking engagement with the lower surface of the plate.

Figure 5:
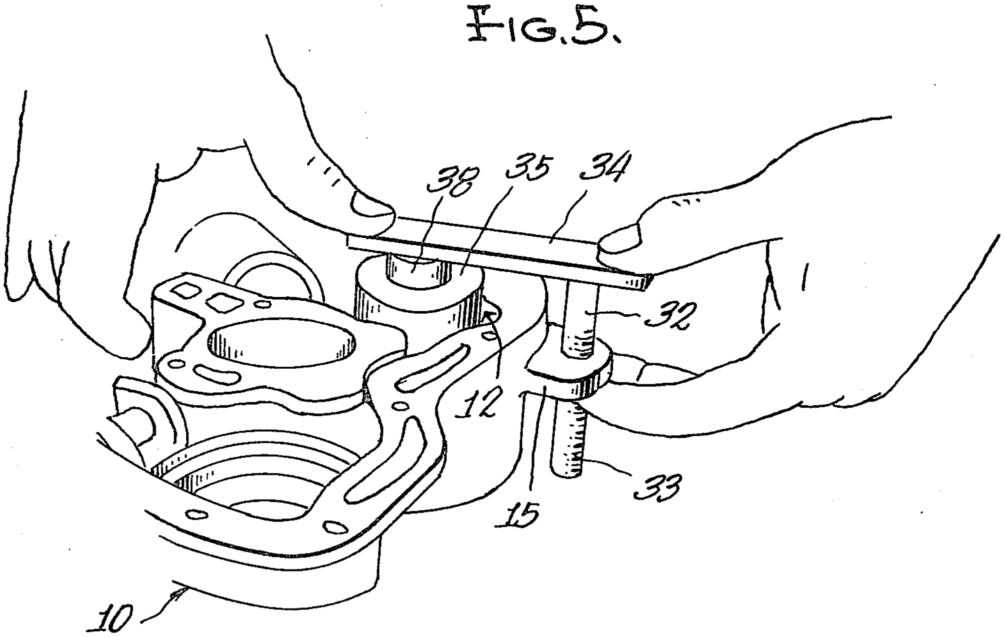
FIG. 5 is a fragmentary perspective view showing a slightly modified tool for compressing the kickdown spring of the rear servo of the transmission.

The tool may be placed in operating condition by inserting the plug pilot portion 36 within the opening 31 of the spring retainer 30 and inserting the stem 32 into the hole in the manufacturing lug 15. The plate 34 may be pressed downwardly by hand, as shown in FIG. 5, an amount sufficient to displace the spring retainer inwardly and thus compress the kickdown spring 40. When hand pressure is released from the plate, the tool will cant slightly and cause the stem 32 to bind in the manufacturing lug opening 16 to thus hold the tool in position to compress the spring. The snap ring lock 41 may then be removed and thereafter hand pressure may be applied to the plate 34 to right the tool so that the stem 32 may be removed from the manufacturing lug hole.

I claim:

1. The method of removing a snap ring lock from seating relation in a groove at the open end of a bore in the housing of an automatic transmission, said housing having a hole adjacent to said bore and a servo within said bore and including a spring retainer forced against said snap ring lock by a kickdown spring, said method including the steps of:

inserting a rigid stem having a roughened peripheral surface into said housing hole and disposing a rigid plate which is connected to said stem over the open end of said bore, forcing a plug which is interposed between said plate and said spring retainer inwardly of said housing bore and against said spring retainer to displace the latter inwardly of said bore to compress said spring and move said spring retainer from abutting relation with said snap ring lock, whereby the latter may be removed from the groove in which it is seated, and canting said stem to cause it to bind in said housing hole to provide a rigid backup for the forcing action of said plug.

2. The method of claim 1 wherein said stem and plate are rigidly connected with said stem extending from said plate at substantially right angles, said forcing step including inserting said stem into said housing hole and pressing on said plate to cause said abutment to forcibly engage said spring retainer.

3. The method of claim 1 wherein said plug is in threaded relation to said plate, and said forcing step constitutes turning the threads in a direction to advance said plug inwardly of said housing bore to forcibly engage said spring retainer.

4. An improved tool for use in compressing the kick-down spring of a servo in an automatic transmission so that a spring retainer may be displaced from abutment with a snap ring lock whereby the latter may be removed, said transmission having a housing with a bore in which said servo is disposed, and a hole adjacent to said servo, said improved tool comprising:

a rigid stem of a transverse size to freely fit into said hole and when canted to bind in said hole and thereby hold said tool in position on said housing, said stem having a roughened peripheral surface so that it has good gripping engagement with the surface defining said housing hole when said stem is canted, a rigid plate connected at one end to said stem and being of a length so that its other end overlies said servo, and means interposed between said plate and said spring retainer to apply pressure thereagainst and move it inwardly of said housing bore and displace it from abutment with said snap ring lock so that the latter is accessible for removal from said housing bore.

5. The construction according to claim 1 wherein said interposed means includes a screw rod threaded through said plate other end and it and said stem extend from said plate substantially at right angles thereto, and a plug connected to that end of said screw rod which is on the same side of said plate as said stem, said plug being forced against said spring retainer by rotation of said screw rod in a predetermined direction.

6. The construction according to claim 4 wherein said spring retainer has a central aperture, and said interposed means comprises a plug having a pilot portion to fit into said aperture and a rounded head portion bearing against the adjacent facing surface of said plate.

* * * * *

UNITED STATES PATENT OFFICE
CERTIFICATE OF CORRECTION

PATENT NO. : 3 949 459

DATED : April 13, 1976

INVENTOR(S) : John A. Marenchin

It is certified that error appears in the above-identified patent and that said Letters Patent are hereby corrected as shown below:

Column 4, claim 5, line 16, claim "1" should read

- - - - -4 - - - - - -.

Signed and Sealed this

Twentieth Day of July 1976

[SEAL]

*Attest:*

RUTH C. MASON
*Attesting Officer*

C. MARSHALL DANN
*Commissioner of Patents and Trademarks*